United States Patent Office 3,418,093
Patented Dec. 24, 1968

3,418,093
STEAM REFORMING OF HYDROCARBONS
Phineas Davies, Norton-on-Tees, England, assignor to Imperial Chemical Industries Limited, London, England, a corporation of Great Britain
No Drawing. Filed Jan. 16, 1964, Ser. No. 338,019
Claims priority, application Great Britain, Jan. 29, 1963, 3,628/63
4 Claims. (Cl. 48—214)

ABSTRACT OF THE DISCLOSURE

In a process of steam reforming hydrocarbons the catalyst comprises nickel in a concentration of 20–80% calculated as NiO and a refractory support consisting essentially of co-precipitated alumina-chromia and a hydraulic binding agent. The process is continuously operable at low steam excesses without carbon lay-down.

---

This invention relates to catalysts of improved activity and resistance to carbon lay-down in the steam reforming of hydrocarbons and to a hydrocarbon steam reforming process using them.

The invention provides a catalyst as hereinafter defined comprising nickel or a compound thereof capable of being reduced to nickel metal in a concentration in the range 20%–80% by weight of the catalyst calculated as NiO and a refractory support consisting essentially of co-precipitated alumina-chromia and a hydraulic binding agent.

The term "catalyst" is used herein to refer to the composition in its active form in which it promotes the steam reforming of hydrocarbons, also to the material charged to the process converter before it has undergone chemical changes in contact with the reactants or products, and also to material containing all the ingredients but which requires one or more simple processing steps such as calcination, steaming, reduction or shaping before it is ready for charging to the process converter.

Preferably the nickel is associated particularly with the co-precipitated alumina-chromia, as obtains for example if the catalyst before reduction consists essentially of co-precipitated nickel oxide, alumina and chromia and a hydraulic binding agent.

The ratio of nickel (as NiO) to co-precipitated alumina chromia is preferably in the range 3.5:1 to 1:3, especially 0.6±30%, by weight.

The proportion of alumina to chromia in the co-precipitated alumina-chromia, that is excluding the alumina derived from the hydraulic binding agent, is preferably in the range 3:1 to 6:1 by weight.

The proportion of nickel in the total catalyst is preferably in the range of 20% to 40% calculated as NiO.

The catalyst may contain, in addition to the nickel, a small amount (e.g. from .001–0.1%) of a platinum group metal in accordance with British applications Nos. 26,997/29,122/62–2,564/63 in order to increase the activity thereof. Of these metals, platinum is particularly preferred because of its effectiveness.

The hydraulic binding agent is preferably used in an amount in the range 10%–40% by weight of the total catalyst. As a hydraulic binding agent a low silica aluminous cement is particularly preferred, e.g. "Secar" (registered trademark) or "Ciment Fondu" (registered trademark). Portland cement also may be used.

In the preparation of the catalyst the nickel constituent in the form of a soluble compound should be contacted with freshly precipitated alumina-chromia, that is, co-precipitated alumina-chromia which has not been dried. The catalyst is preferably prepared by co-precipitating aluminium, chromium and nickel "carbonates" from a solution containing their salts, e.g. the nitrates, by addition of or to an alkali metal carbonate or ammonium carbonate, washing the precipitate, drying, heating at about 350°–500° C. to convert the "carbonates" at least partly to oxides, crushing, mixing with aluminous cement and setting the cement. (The term "carbonates" is used to denote the mixture of carbonates, basic carbonates and hydroxides formed in the co-precipitation step.)

The catalyst may be used in any of the commonly used shapes, for example rings, or (more preferably) pellets, for example right cylindrical pellets having a maximum thickness between 2 mm. and 10 mm. They may be produced for example by moulding, by compression, by pelleting under pressure or by extrusion.

The invention comprises also a process of steam reforming hydrocarbons boiling at temperatures up to 350° C. in which the said hydrocarbons are passed with steam over a catalyst according to the invention. The invention is particularly applicable to the steam reforming of liquid hydrocarbons, for example those boiling at temperatures in the range 30° C.–220° C. and more particularly in the range 30° C.–170° C. since the higher molecular weight hydrocarbons are more difficult to reform than those of lower molecular weight. Thus petroleum light distillates, also called naphthas, are particularly suitable.

The temperature used may be for example in the range 400° C.–950° C. The pressure may be for example between 15 and 750 p.s.i.g. and is preferably in the range 200–500 p.s.i.g.

In one form of the invention the product gas is a synthesis gas, for example for the production of ammonia or methanol; and in this form it is preferred in order that the methane content of the product gas should be as low as conveniently possible to use temperatures in the range 600° C.–900° C. with moderate pressures for example 15 to 450 p.s.i.g. and relatively high steam ratios, for example about 2.5 to about 5.0 moles of steam per atom of carbon in the hydrocarbon feedstock.

The catalyst according to this invention has been found to show useful activity also at low temperatures, e.g. in the range 400° C.–700°C. and particularly at 450° C.–650° C. and it is therefore particularly useful in processes conducted at such temperatures, at high pressures, e.g. 100–500 p.s.i.g. and at low steam ratios, e.g. 1.5–3.0 and preferably also at space velocities sufficiently low to avoid undue non-conversion of the feedstock, in order to produce a gas containing a substantial proportion of methane, the product being thereby suitable as the base for a town gas. Convenient processes useful in the production of such gases are those of British applications Nos. 20,375/62, 32,288/62 and 32,289/62, 45,035/62. The catalyst has also been found, surprisingly, to show substantial resistance to carbon formation, being in this respect similar to the catalysts of British application No. 20,652/60.

EXAMPLE

Catalyst A.—A solution of 1.1 kg. Al(NO$_3$)$_3$·9H$_2$O, 262.4 g. Cr(NO$_3$)$_3$·9H$_2$O and 990 g. Ni(NO$_3$)$_2$·6H$_2$O (200 g. Ni) in 4 litres of water was cooled to below 5° C. Then 1 kg. sodium carbonate in 8 litres of water at a similar temperature was added and the dark blue precipitate was filtered off, washed and dried at 120° C. and then heated at 450° C. for 6 hours. The material was then crushed, mixed with 30% by weight of "Ciment Fondu" (registered trademark), pelleted and heated in steam to set the cement. The obtained catalyst A contained Al$_2$O$_3$ 37.3% (of which 30.1% was derived from the co-precipitation and 6.2% from the cement), CaO 6.2%. SiO$_2$ 0.9%, Fe$_2$O$_3$ 3.2%, Cr$_2$O$_3$ 7.1% and NiO 26.0%; the weight loss on heating at 900° C. was 11.4%. Thus the composition in the terms of the definition of the invention was $Al_2O_3$ 42.1% (34% from the co-precipitation, 8% from the cement), CaO 8%, $SiO_2$ 1%, $Fe_2O_3$ 3.6% $Cr_2O_3$ 8%, and NiO 29.3%. Before use it was reduced in steam and hydrogen at 750° C.

Catalyst B.—This was, for comparison, a catalyst in accordance with our co-pending British application No. 20,652/60 which contained: $Al_2O_3$ 21.6%; NiO 17.8%; $SiO_2$ 12.2%; CaO 9.4%; MgO 11.6%; $Ni_2O$ 0.2%; $SO_3$ 0.3%; $Fe_2O_3$ 4.3% and $K_2O$ 5.2%; the weight loss on heating at 900° C. being 17.4%.

These catalysts were tested in the steam reforming of a petroleum light distillate of B.P. 30° C.–170° C. at atmospheric pressure under conditions designed to show differences in activity. Thus the liquid hydrocarbon space velocity was 2.5, the steam ratio was 5.0 and the temperature was 600° C. or 700° C. The results are given in the table. In practice lower space velocities, higher pressure, e.g. 200–500 p.s.i.g. and lower steam ratios e.g. 1.5–3.5 are preferably used.

TABLE

| | Temperature, ° C. | | | |
|---|---|---|---|---|
| | 600 | | 700 | |
| | A | B | A | B |
| Catalyst: | | | | |
| Percent $Al_2O_3$ | 37.3 | 21.6 | 37.3 | 21.6 |
| Percent $Cr_2O_3$ | 7.1 | | 7.1 | |
| Percent NiO | 26.0 | 17.8 | 26.0 | 17.8 |
| Product: | | | | |
| Liquid water, l./hr | 100 | 100 | 84.5 | 94 |
| Hydrocarbon, l./hr | 9 | 14 | 2 | 3 |
| Gas rate, l./hr | 54 | 36 | 93 | 71 |
| Analysis, percent: | | | | |
| $CO_2$ | 17.8 | 20.6 | 13.6 | 13.3 |
| CO | 6.8 | 4.4 | 11.4 | 13.6 |
| $CH_4$ | 0.8 | 0.7 | 1.8 | 2.6 |
| $H_2$ | 72.2 | 72.2 | 71.4 | 56.6 |
| $C_nH_{2n}$ | <0.1 | 0.9 | 1.0 | 2.7 |
| Conversion, percent | 64 | 44 | 92 | 88 |
| Yield (CO+$H_2$) percent | 45 | 29 | 82 | 61 |
| Carbon lay-down | (¹) | None | (¹) | None |

¹ Very slight.

The catalysts were also tested under conditions designed to show differences in carbon lay-down using a liquid hydrocarbon space velocity of 9.0 at a steam ratio of 2.0 and atmospheric pressure, first for 4 hours at 600° C. and then for 2 hours at 550°. Both catalysts behaved very similarly, Catalyst A being somewhat more caked with carbon than Catalyst B.

What is claimed is:

1. A process of steam reforming normally liquid hydrocarbons boiling at temperatures from about 30° C. to 220° C., comprising passing the said hydrocarbons and steam at ratio of about 1.5 to about 5 moles of steam per atom of carbon in the said hydrocarbons over a catalyst comprising a material selected from the group consisting of nickel and a compound of nickel capable of being reduced to nickel metal, and a refractory support consisting essentially of co-precipitated alumina-chromia and a hydraulic binding agent, the ratio of nickel, calculated as nickel oxide, to co-precipitated alumina-chromia being in the range 3.5:1 to 1:3 by weight and the ratio of alumina to chromia in the co-precipitated alumina-chromia being in the range 3:1 to 6:1 by weight.

2. A process according to claim 1 wherein the hydrocarbon feedstock is a liquid hydrocarbon boiling in the range 30° C. to 170° C.

3. A process according to claim 1 wherein the catalyst before reduction consists essentially of co-precipitated nickel oxide, chromia and alumina.

4. A process according to claim 1 wherein the hydraulic binding agent is present in an amount in the range 10% to 40% by weight of the total catalyst.

References Cited

UNITED STATES PATENTS

| 1,943,821 | 1/1934 | Hanks et al. | 23—212 X |
| 2,038,566 | 4/1936 | Huettner et al. | 23—212 |
| 2,119,565 | 6/1938 | Williams | 23—212 |
| 2,125,743 | 8/1938 | Sweeney et al. | 23—212 |
| 2,982,327 | 5/1961 | Turner et al. | 252—466 X |

FOREIGN PATENTS

| 1,307,327 | 9/1962 | France. |

JOSEPH SCOVRONEK, *Primary Examiner.*

U.S. Cl. X.R.

23—212; 252—463, 465, 466